United States Patent Office 2,788,367
Patented Apr. 9, 1957

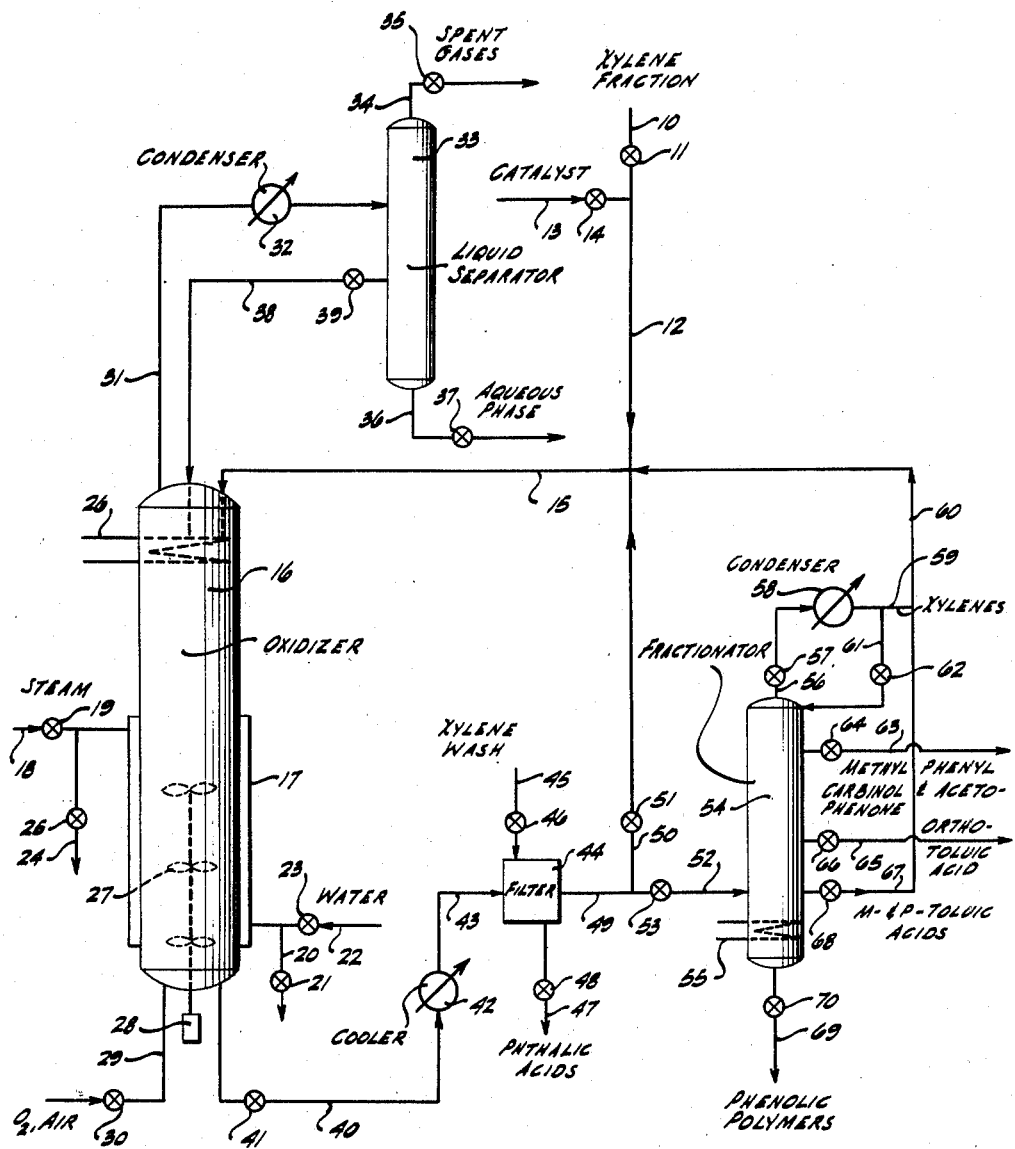

2,788,367

XYLENE OXIDATION PROCESS

John L. Bills, Long Beach, and William L. Stanley, Brea, Calif., assignors to Union Oil Company of California, Los Angeles, Calif., a corporation of California Application March 5, 1953, Serial No. 340,618

9 Claims. (Cl. 260—524)

This invention relates to a method of oxidizing alkyl substituted benzenes to produce dicarboxylic acids. More particularly, it relates to a method of oxidizing xylenes or mixtures of xylenes, as for example xylene fractions which may contain ethyl benzene, to produce isophthalic and terephthalic acids. More particularly, the invention relates to a continuous process involving the catalytic liquid phase oxidation of pure xylenes or mixtures of xylenes to produce dicarboxylic acids.

In the past the liquid phase oxidation of xylenes has resulted in the production of the corresponding toluic acids with only minor proportions of phthalic acids being produced and no satisfactory method has been devised for converting xylenes to phthalic acids in a one step liquid phase oxidation. The liquid phase oxidation of para-xylene, for example, results in the production of relatively large proportions of para-toluic acids, however, it has been impossible to obtain more than about 6 or 7% of terephthalic acid in the oxidation product. By oxidizing in a continuous manner, which involves continuously adding feed to the oxidation unit and removing phthalic acid from the oxidizer as it is formed, it is found that oxidation can be continued for only a relatively short period of time before oxdiation ceases. The oxidation of meta-xylene leads to the same results, although in this case the oxidation ceases after even a shorter period of time. On the other hand, when oxidizing pure ortho-xylene in the liquid phase the oxidation stops at the ortho-toluic acid stage. Apparently, ortho-toluic acid is not further oxidized under the conditions normally employed for side chain oxidation.

It has now been found that xylene fractions containing meta- and/or para-xylene can be oxidized in a continuous manner to produce the corresponding isophthalic and/or terephthalic acids and that the reaction may be continued indefinitely without a decrease in the rate of oxidation provided that certain relatively high boiling oxidation inhibitors which are formed and tend to accumulate in the oxidation charge are removed. Thus, it is found that if the product of oxidation is removed from the oxidation vessel at intervals, or in a continuous manner, filtered to remove phthalic acid and then a portion of the filtrate fractionally distilled to leave as a bottoms material those oxidation products boiling above the boiling point of toluic acids, the portion of the distillate comprising unoxidized xylenes and meta- and para-toluic acids may be returned to the oxidizer along with the portion of the filtrate not distilled and the oxidation continued for an indefinite number of cycles. In this process sufficient xylene feed is added to maintain an approximately constant charge in the oxidizer. The material removed as bottoms from the fractional distillate of the filtrate is believed to consist of phenolic polymers and it is postulated that it is these materials which act as oxidation inhibitors when the concentrate of these phenolic polymers is permitted to build up in the oxidation charge. Regardless of applicants' interpretation, the fact is that by removing from the partially oxidized xylene charge the isophthalic and terephthalic acids and a fraction of high boiling polymeric phenolic materials, it is possible to continue the oxidation indefinitely whereas wtihout the removal of these materials it is found that oxidation ceases after a relatively short period of time.

It is an object of this invention to provide a continuous process by means of which xylenes and xylene fractions may be oxidized catalytically in the liquid phase, using oxygen or an oxygen-containing gas, to produce isophthalic acid, terephthalic acid or mixtures of these acids.

It is a more particular object of this invention to provide a process for the catalytic liquid phase oxidation of xylenes or xylene fractions which will proceed indefinitely and without a decrease in rate of oxidation, which method involves the removal of oxidation inhibitors which normally form during oxidation of xylenes.

Another object of this invention is to provide a process for the liquid phase oxidation of a xylene fraction comprising the three isomeric xylenes and ethyl benzene, which process results in the conversion of meta- and para-xylenes into the corresponding isophthalic and terephthalic acids, ortho-xylene into ortho-toluic acid and ethyl benzene into methyl phenyl carbinol and acetophenone, which process can be effected in a continuous manner and can be continued indefinitely without decrease in rate of oxidation.

It has been found that if meta- and/or para-xylene is oxidized in the liquid phase at temperatures of about 130° C., using cobalt naphthenate or other well known catalyst as a catalytic agent, the toluic acid content of the liquid being oxidized will increase to 65–75% and the phthalic acid content will reach a maximum of about 7% before oxidation ceases. If at this time, or preferably when the phthalic acid content is about 5% the product is filtered hot to remove the phthalic acid and the filtrate returned to the oxidizer together with enough of the xylene feed to maintain a constant oxidation charge and additional catalyst, the mixture may then be further oxidized to produce additional quantities of phthalic acid. Operating in this manner it is observed that after six to eight cycles, during which decrease in rate of oxidation is noted, further oxidation does not take place. However, if a portion of the filtrate obtained after removing phthalic acids, for example 50% of this filtrate, is distilled to a temperature such that substantially all of the toluic acids and lower boiling materials are distilled leaving higher boiling materials as a residue, the distillate may be returned to the oxidizer together with the remainder of the filtrate and make-up xylene feed and the oxidation may be continued for an indefinte number of cycles without any appreciable decrease in the rate of oxidation.

It is further found that if ethyl benzene is present in the oxidation feed along with meta- and para-xylene, the oxidation may still be continued in a continuous manner by operating the distillation unit in such a manner as to remove as a separate overhead fraction the products of oxidation of the ethyl benzene. In this case, the portion of the filtrate from the phthalic acid recovery stage which is distilled is passed through a fractionator maintained under such conditions of temperature and pressure that the overhead from the fractionator will consist of materials boiling below the boiling point of the oxidation products of ethyl benzene, particularly methyl phenyl carbinol and acetophenone. These latter two compounds are produced as a side cut from the fractionator and meta- and para-toluic acids are then produced as a second side cut, leaving materials boiling above the boiling point of the toluic acids as a distillation residue. The acetophenone and methyl phenyl carbinol are not returned to the oxidizer, however, the overhead fraction and the toluic acid fraction are combined and returned to the oxidation unit.

Since ortho-xylene is not converted into phthalic acid under the conditions of oxidation normally employed, but is oxidized only to the ortho-toluic acid stage, it is preferable that the xylene feed to the oxidizer be substantially free from the ortho isomer. However, the process of this invention is capable of handling a feed stock containing appreciable quantities of ortho-xylene. In order to accommodate the ortho-xylene and thus prevent the build up of ortho-toluic acid in the charge being oxidized, this acid may be removed in the distillation stage. In case the feed is a xylene fraction containing appreciable quantities of each of the three xylene isomers and ethyl benzene, the fractional distillation column or columns will be operated to take as overhead, materials boiling below the boiling point of methyl phenyl carbinol and acetophenone, to produce as a first side cut the methyl phenyl carbinol and acetophenone, as a second side cut the ortho-toluic acid, and as a third side cut a mixture of meta- and para-toluic acids, thereby leaving materials boiling above the meta- and para-toluic acids as a distillation residue. In this case the methyl phenyl carbinol-acetophenone fraction and the ortho-toluic acid fraction will be taken as products for separate handling and utilization, and the overhead material and the mixture of meta- and para-toluic acids will be combined and returned to the oxidizer for further oxidation.

The process of this invention may be better understood by reference to the drawing which is a diagrammatic representation of a system suitable for carrying out the process of this invention. In this description, the process will be described as applying to a xylene fraction containing ortho-xylene, meta-xylene, para-xylene and ethyl benzene. Referring to the drawing, the xylene fraction obtained from storage, not shown, enters through line 10 controlled by valve 11 and is mixed in line 12 with catalyst entering through line 13 controlled by valve 14. The catalyst is preferably a cobalt or manganese salt, as for example, the naphthenate, oleate, toluate salt of one of these metals. The amount of catalyst added will be such as to maintain a metal content in the charge in the oxidizer between 0.0005% and 0.1% and preferably between 0.001% and 0.05%.

The feed mixture entering through line 12 is passed through line 15 into oxidizer 16. The oxidizer is a pressure vessel made of or lined with stainless steel or other acid resistant material and is fitted with heating and cooling means represented by jacket 17 which may be used for heating with steam or other heating medium or cooling with water or other coolant. In order to initiate the reaction, steam may be introduced through jacket 17 through line 18 controlled by valve 19 and condensate removed through line 20 controlled by valve 21. After the oxidation reaction is started, cooling may be necessary, in which case water or other cooling medium may be introduced into the jacket through line 22 controlled by valve 23 and removed through line 24 controlled by valve 25. The oxidation vessel is fitted with a closed coil 26 which serves as a knock back or cooling coil, and is located near the top of the vessel, and with a high speed stirring device 27, operated by means of motor 28. The stirrer is employed in order to effect good dispersion of the oxidizing gas in the oxidation charge.

Oxygen, air or other oxygen-containing gas is introduced into the oxidation vessel through line 29 controlled by valve 30. In the case of oxygen, a rate of 2.5 cu./ft./hr./kg. of charge appears to be satisfactory. With air a somewhat greater rate is desirable. Spent gases are vented through line 31 and are passed through condenser 32 into liquid separator 33 where entrained liquids are separated from the spent gases which pass from the liquid separator through line 34 controlled by valve 35. The entrained liquids which are trapped in liquid separator 33 separate into two phases, an aqueous phase consisting of water and low molecular weight fatty acids, aldehydes and the like, and an oil phase consisting primarily of xylenes. The aqueous phase is removed from the separator through line 36 controlled by valve 37 and may be passed to a recovery system, not shown, for recovery of the low molecular weight acids, aldehydes, etc. The oil phase from the liquid separator is returned through line 38 controlled by valve 39 to the oxidizer.

The xylenes present in the oxidizer are maintained at a temperature of about 135° C. and usually within the range of 100° C. to 150° C. until the phthalic acid content is between about 3% and about 6%. This will generally require 6 to 12 hours. At this time the toluic acid content of the oxidation charge is between 50% and about 65 or 70%. Product is removed from the bottom of the oxidizer, at a rate of about 0.5 volume per hour per volume of charge, through line 40 controlled by valve 41 and passed through cooler 42 where the temperature is reduced to between 100° C. and 135° C. and preferably to about 110° C. in order to cause the crystallization of substantially all of the phthalic acids present without effecting crystallization or separation of the toluic acids, and the cooled product is passed through line 43 into filter 44 where phthalic acids are separated from the oxidation product. The phthalic acids, before being removed from the filter, are preferably washed with xylene or xylene fraction entering through line 45 controlled by valve 46. Following this wash the phthalic acids are removed through line 47 controlled by valve 48. The filtrate and the xylene wash leave the filter through line 49. As will be apparent, two or more of the filtration units would generally be used so that one of these units could be used for filtration while another is being washed. The use of multiple filtration units is well known in the art and need not be further illustrated or described.

The filtrate leaving the filter through line 49 is divided into two streams, one passing through line 50 controlled by valve 51 is returned through line 15 to the oxidizer. The second stream is passed through line 52 controlled by valve 53 to fractionator 54. The proportion of the filtrate stream being passed to the fractionator is preferably about 50% of the filtrate although this proportion may be any proportion above about 15–20% of the filtrate. It is desirable, of course, to maintain this proportion as low as permissible in order to avoid the higher costs involved in fractionating the higher proportions. Generally, the wash xylene leaving the filter through line 49 is all returned to the oxidizer through lines 50 and 15.

Fractionator 54 may consist of a single distillation column as shown or, as is apparent to one skilled in the art, this fractionating device may consist of two or more distillation columns. A single column suffices to illustrate the invention. The column is fitted with means for providing heat to obtain the temperatures necessary to effect distillation, as for example, closed steam coil 55. The fractionator is provided with an outlet at the top through which an overhead fraction may be removed. Thus, the overhead is passed through line 56 controlled by valve 57 into condenser 58. The condensed overhead fraction leaving condenser 58 may be passed through line 59 into line 60 and returned through line 15 to the oxidizer. A portion of the overhead fraction in line 59 is returned through line 61, controlled by valve 62, to the top of the column as reflux. Fractionator 54 is also fitted with outlets to permit the production of three side cut streams, and in operating on the xylene fraction described above, the first side cut stream removed through line 63 controlled by valve 64 will consist primarily of methyl phenyl carbinol and acetophenone. This stream is run to storage, not shown, for separate handling. The second side cut, removed through line 65 controlled by valve 66 will consist primarily of ortho-toluic acid. This stream is run to storage, not shown, for separate handling. The third side cut removed through line 67 controlled by valve 68 consisting primarily of meta- and para-toluic acids is returned through lines 60 and 15 to the oxidizer for further oxidation. The distillation residue from fractionator 54 is removed through line 69 controlled by valve 70. This residue consists of phenolic polymers and small proportions of mixed isophthalic and terephthalic acids. The phthalic acids present in this bottoms material may be recovered by extraction with alkali as is well understood in the art.

It should be pointed out that sufficient xylene fraction may be added continuously or intermittently through line 14 to maintain a substantially constant level in the oxidizer. Moreover, sufficient catalyst is added as described above to maintain the desired catalyst concentration.

Catalysts for the oxidation in addition to the cobalt and manganese salts which are particularly preferred include the salts of cerium, vanadium, copper, lead, nickel, etc. It is convenient to add these catalysts in an oil-soluble form, such as in the form of naphthenates, toluates, oleates or similar salts. However, inorganic salts or oxides of the various metals may be added and presumably these compounds are converted to soluble salts, as for example toluates, in the oxidizer.

The conditions under which the oxidation is effected may be varied over relatively wide ranges of temperature, pressure, rate of blowing with air or oxygen, and the like. Thus, although preferably the oxidation is effected in the oxidizer, which may be referred to as the oxidation zone, at about 130–140° C. it is found that under certain conditions of pressure and rate of introducing oxygen or air, temperatures between about 100° C. and 150° C. may be used. Pressures from atmospheric to 500 pounds gage may be employed. Furthermore, the rate of introducing the gas containing free oxygen may vary from about 1 to about 3 standard cubic feet per hour per kilogram of charge.

The gas containing free oxygen may be oxygen, oxygen enriched air or air. Depending upon the efficiency of the utilization of the oxygen in the process, it is sometimes desirable to remove carbon dioxide from the exit gases and return the remainder, or a portion of the remainder, of the exit gases to the oxidizer. This is particularly true when oxygen is used as the oxidizing gas. Also it is sometimes desirable to inject small amounts of oxidation accelerator, as for example an oxide of nitrogen such as NO or $NO_2$ into the oxidizer along with the oxygen or air.

It is desirable that the rate of withdrawing product from the oxidizer for removal of isophthalic and/or terephthalic acids be such that the phthalic acid content of the material present in the oxidizer remains between about 3% and about 6 or 7% by weight. Apparently an optimum content is about 4%. This is accomplished using a withdrawal rate of between about 0.2 volumes and about 2 volumes per hour per volume of charge in the oxidizer. Preferably the rate will be between 0.5 and 1 volume per hour per volume of charge.

The yield of isophthalic and/or terephthalic acid is usually about 100–115% by weight of the meta- and para-xylenes present in the feed to the oxidizer, corresponding to a yield of approximately 65 to 75% of the theoretical. Rates of production of mixed phthalic acids using a xylene fraction containing 0.3% ortho-xylene have been approximately 3.5% to 4% per hour or higher, based on the oxidation charge.

The isophthalic and terephthalic acids removed from the filters are white, relatively pure products. When obtained as a mixture, as for example, when produced by oxidizing a mixture containing both meta- and para-xylene, the product may be utilized without further separation or purification in the production of esters useful as plasticizers for alkyd base paints and the like. The phthalic acids may be separated as by taking advantage of differential solubility in selected solvents, as for example, xylene, toluene, benzene and the like. The isophthalic acid is useful in preparing plasticizers and the terephthalic acid is useful in the preparation of polyester fibers as is well known in the art.

The side stream products obtained from the fractionator which are not returned to the oxidizer are also valuable products of the oxidation process of this invention. Thus, the mixture of acetophenone and methyl phenyl carbinol resulting from the oxidation of ethyl benzene may readily be converted into styrene by methods well known in the art and the latter is useful in preparing plastics. The ortho-toluic acid resulting from the oxidation of ortho-xylene may be readily converted into phthalic acid or phthalic anhydride by a catalytic vapor phase oxidation process.

The following examples will serve to illustrate the invention:

*Example I*

A mixed xylene fraction containing 66.4% m-xylene, 30.4% p-xylene, 0.3% o-xylene and 3.0% ethyl benzene was placed in a glass oxidation vessel together with 0.06% of cobalt as the naphthenate and heated to 135° F. at ordinary pressures. The oxidation vessel was fitted with a reflux condenser and a trap in the condensate line was arranged so that aqueous material could be removed from the system and the xylenes, separated from exit gases, could be returned to the oxidizer. Oxygen was blown into the mixed xylenes at a rate of 2.5 standard cubic feet per hour per kilogram of charge and the mass was vigorously agitated by means of a high speed stirrer. After 10 hours of oxidation the phthalic acid content of the charge was found to be 7% by weight. The total charge was removed from the oxidation vessel and filtered at a temperature of about 120° F. to remove the phthalic acid. The filtrate was divided into two portions; 85% by volume of the filtrate being returned directly to the oxidizer and 15% by volume of the filtrate being distilled under vacuum to take as overhead 90–95% of the distillation charge, leaving 5–10% as a bottoms material. The bottoms was discarded and the overhead material returned to the oxidizer along with sufficient fresh xylene feed and catalyst to make up for the phthalic acid and distillation bottoms removed and to maintain approximately 0.06% by weight of catalyst calculated as cobalt in the oxidation charge.

This operation was repeated and carried through 16 cycles with an average production of 34.2 grams of phthalic acid per kilogram of charge per hour. The oxidation time of each cycle following the initial cycle was 3.5 hours. The 16th cycle showed no decrease in rate of oxdation or yield of phthalic acid over the original cycle.

*Example II*

For purposes of comparison with the results obtained in Example I and to show the value of distilling a portion of the filtrate obtained after removal of phthalic acid to eliminate high boiling materials which appear to act as oxidation inhibitors, Example I was repeated using the same mixed xylene feed stock and using the same conditions of temperature, rate of blowing with oxygen, amount of catalyst, stirring, etc. In this case the initial oxidation was similar to that obtained in the initial oxidation in Example I. At the end of 10 hours the product was removed from the oxidizer and filtered and the total filtrate returned to the oxidizer together with make-up xylene and catalyst. This charge was carried through 3 cycles. In the second oxidation the rate of production of phthalic acid was 17.4 grams per hour per kilogram of charge and in the third cycle the rate dropped to 5.0 grams of phthalic acid per hour per kilogram of charge.

Although a fourth oxidation was attempted further blowing with oxygen did not cause oxidation.

Example III

A mixed xylene feed consisting of 56.0% m-xylene, 24.8% p-xylene, 0.3% o-xylene and 18.9% ethyl benzene was oxidized at a temperature of 135° C. and atmospheric pressure using oxygen as the oxidizing gas and 0.05% by weight of cobalt in the form of the naphthenate as catalyst. The rate of blowing with oxygen was such that only a relatively small amount of oxygen was eliminated from the system with the exit gases. After about 10 hours of oxidation, product was removed from the oxidizer at a rate of about 750 grams per kilogram of charge per hour, filtered to remove phthalic acids and the filtrate stream divided into two equal volume portions. One portion was returned directly to the oxidizer and the second portion was fractionally distilled taking as overhead, materials boiling below the boiling point of the mixture of acetophenone and methyl phenyl carbinol. This overhead material was returned to the oxidizer. A mixture of methyl phenyl carbinol and acetophenone in a yield of approximately 30 grams per hour per kilogram of charge in the distillation vessel was produced as a first side cut. A second side cut, consisting of mixed toluic acids was returned to the oxidation vessel along with the overhead, the undistilled filtrate and make-up xylene containing sufficient cobalt naphthenate to maintain a metal content of approximately 0.05% by weight in the oxidizer. In the distillation, a bottoms fraction amounting to about 10% of the distillation charge was discarded. Approximately 22 grams of mixed phthalic acids per hour per kilogram of oxidation charge was produced and the rate of production of phthalic acids did not decrease during the run which was continued for approximately 50 hours.

Example IV

For purposes of comparison Example III was repeated with the same stock and conditions of oxidation. However, in this case, the filtrate stream, after removal of phthalic acid was all returned to the oxidizer together with make-up xylene and catalyst. The original rate of production of phthalic acid was the same as that reported in Example III, however, after about 18 hours oxidation ceased.

Example V

Example III was repeated using a substantially pure para-xylene as feed stock. The conditions of oxidation were the same as those described in that example. The yield of terephthalic acid amounted to approximately 30 grams per hour per kilogram of charge. No decrease in rate of production of terephthalic acid was observed during the run.

Example VI

Example III was repeated with the exception that a temperature of 130° C. was employed and the catalyst added to the oxidation charge and to make-up xylene during the oxidation was manganese naphthenate. Results obtained were substantially the same as those described in Example III.

The foregoing description of our invention is not to be taken as limiting our invention but only as illustrative thereof since many variations may be made by those skilled in the art without departing from the scope of the following claims.

We claim:

1. A process for oxidizing xylene to produce phthalic acid which comprises contacting xylene in the liquid phase, in the presence of an oxidation catalyst, with a gas containing free oxygen at a temperature between about 100° C. and about 160° C., separating phthalic acid from the reaction mixture, distilling about 15 to 50% of the liquid portion of the reaction mixture to a temperature sufficient to vaporize toluic acids, discarding the distillation residue, and returning any undistilled liquid reaction mixture and the resulting distillate for further oxidation.

2. A process for oxidizing xylene to produce phthalic acid which comprises contacting xylene and an oxidation catalyst in the liquid phase, with a gas containing free oxygen, at a temperature between about 100° C. and about 160° C. until the phthalic acid content of the oxidized mixture is between about 3% and about 6% by weight, separating phthalic acid from the reaction mixture, distilling about 15 to 50% of the liquid portion of the reaction mixture to a temperature sufficient to vaporize toluic acids, discarding the distillation residue, and returning any undistilled liquid portion and the resulting distillate together with additional xylene feed for further oxidation.

3. A process for producing terephthalic acid from para-xylene which comprises oxidizing a xylene fraction containing para-xylene in the liquid phase with a gas containing free oxygen at a temperature between about 130° C. and about 140° C., separating terephthalic acid from the reaction mixture, distilling about 15 to 50% by volume of the liquid portion of the reaction mixture to remove between 5% and 10% of the distillation charge as bottoms and returning the overhead distillate, and any undistilled liquid reaction mixture together with make-up xylene fraction for further oxidation.

4. A continuous process for the production of phthalic acid from xylene which comprises contacting a mixture of xylene and catalyst in the liquid phase with a gas containing free oxygen in an oxidation zone at a temperature between about 100° C. and about 160° C. until the phthalic acid content of the mixture is between about 3% and about 6% by weight, thereafter continuously removing reaction mixture from the oxidation zone, separating phthalic acid from the removed reaction mixture, distilling about 15 to 50% of the liquid portion of said reaction mixture to produce as distillate the material boiling below the boiling point of phthalic acids, discarding the distillation residue and returning at least a portion of said distillate together with any undistilled liquid reaction mixture and make-up xylene to the oxidation zone.

5. A continuous process for the production of isophthalic and terephthalic acids from a xylene fraction containing m-xylene, p-xylene and ethyl benzene which comprises oxidizing in an oxidation zone said xylene fraction in the liquid phase in the presence of an oxidation catalyst with a gas containing free oxygen at a temperature between about 100° C. and 160° C. until the phthalic acid content of the oxidation mixture is between about 3% and about 6% by weight and thereafter maintaining the phthalic acid content of the oxidation mixture within substantially the range of 3% to 6% by weight by continuing said oxidizing and continuously removing a portion of the reaction mixture from the oxidation zone, separating phthalic acids from the removed reaction mixture, fractionally distilling about 15 to 50% of the liquid portion of said reaction mixture to recover as a first fraction material boiling below the boiling point of a mixture of methyl phenyl carbinol and acetophenone, a second fraction comprising methyl phenyl carbinol and acetophenone, and a third fraction comprising meta- and para-toluic acids, leaving as distillation residue materials boiling above the boiling point of said toluic acids, discarding said second fraction and said distillation residue, and returning said first and third fractions together with any undistilled liquid reaction mixture and make-up xylene fraction to the oxidation zone.

6. A continuous process for the production of isophthalic and terephthalic acids from a xylene fraction containing ortho-, meta- and para-xylenes and ethyl benzene which comprises oxidizing said xylene fraction in the liquid phase in an oxidation zone in the presence of an oxidation catalyst with a gas containing free oxygen at a temperature between about 100° C. and 160° C. until the phthalic acid content of the oxidation mixture is between about 3% and about 6% by weight and thereafter continuing said oxidizing while continuously removing a portion of the reaction mixture from the oxidation zone, separating phthalic acids therefrom, fractionally distilling about 15 to 50% by volume of the liquid portion of said reaction mixture to recover as separate overhead fractions, (1) material boiling below the boiling point of a mixture of methyl phenyl carbinol and acetophenone, (2) a mixture of methyl phenyl carbinol and acetophenone, (3) ortho-toluic acid and (4) a mixture of meta- and para-toluic acids, leaving the distillation residue materials boiling above the boiling point of said fraction 4, discarding fractions 2 and 3 and said distillation residue, and returning fractions 1 and 4 together with make-up xylene fraction to the oxidation zone for further oxidation.

7. A process according to claim 1 in which said gas containing free oxygen is oxygen and said temperature is between about 130° C. and about 140° C.

8. A process according to claim 1 in which said gas containing free oxygen is air and said temperature is between about 130° C. and about 140° C.

9. A process according to claim 1 in which the rate of removal of said reaction mixture from said oxidation zone is between 0.5 part and 2 parts per hour per part of reaction mixture in said oxidation zone.

References Cited in the file of this patent

UNITED STATES PATENTS

| | | |
|---|---|---|
| 2,245,528 | Loder | June 10, 1941 |
| 2,479,067 | Gresham | Aug. 16, 1949 |
| 2,531,173 | Toland | Nov. 21, 1950 |
| 2,552,268 | Emerson et al. | May 8, 1951 |
| 2,587,666 | Toland | Mar. 4, 1952 |
| 2,644,840 | Roebuck | July 7, 1953 |

FOREIGN PATENTS

| | | |
|---|---|---|
| 623,836 | Great Britain | May 24, 1949 |
| 666,709 | Great Britain | Feb. 20, 1952 |
| 1,017,881 | France | Oct. 1, 1952 |